(12) United States Patent
Richman

(10) Patent No.: US 10,582,264 B2
(45) Date of Patent: Mar. 3, 2020

(54) DISPLAY EXPANSION FROM FEATURED APPLICATIONS SECTION OF ANDROID TV OR OTHER MOSAIC TILED MENU

(71) Applicant: Sony Corporation, Tokyo (JP)

(72) Inventor: Steven Richman, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/408,989

(22) Filed: Jan. 18, 2017

(65) Prior Publication Data
US 2018/0205993 A1    Jul. 19, 2018

(51) Int. Cl.
| | |
|---|---|
| H04N 5/445 | (2011.01) |
| H04N 21/462 | (2011.01) |
| H04N 21/482 | (2011.01) |
| H04N 21/431 | (2011.01) |
| H04N 21/43 | (2011.01) |

(52) U.S. Cl.
CPC ..... *H04N 21/4622* (2013.01); *H04N 21/4312* (2013.01); *H04N 21/4821* (2013.01); *H04N 21/4826* (2013.01); *H04N 21/4307* (2013.01)

(58) Field of Classification Search
CPC ................. H04N 21/4307; H04N 21/4312
USPC ..................................................... 725/38–41
See application file for complete search history.

(56) References Cited

U.S. PATENT DOCUMENTS

| | | | | |
|---|---|---|---|---|
| 9,966,112 B1* | 5/2018 | Kulkarni | ............... | G11B 27/10 |
| 2010/0262938 A1* | 10/2010 | Woods | ................... | G06T 15/20 |
| | | | | 715/850 |
| 2011/0047572 A1 | 2/2011 | Hill et al. | | |
| 2011/0055760 A1 | 3/2011 | Drayton et al. | | |
| 2011/0282906 A1* | 11/2011 | Wong | ..................... | G06F 16/434 |
| | | | | 707/780 |
| 2012/0311640 A1* | 12/2012 | Cahnbley | ............... | H04H 60/65 |
| | | | | 725/53 |
| 2013/0055162 A1 | 2/2013 | Arriola et al. | | |
| 2013/0080968 A1 | 3/2013 | Hanson et al. | | |
| 2013/0208135 A1* | 8/2013 | Han | ........................ | G06F 3/017 |
| | | | | 348/211.9 |
| 2014/0019836 A1* | 1/2014 | Sampathkumaran | ........................ | |
| | | | | G06F 16/955 |
| | | | | 715/205 |
| 2014/0320507 A1* | 10/2014 | Myung | .................. | G06F 3/0488 |
| | | | | 345/474 |
| 2014/0365948 A1* | 12/2014 | Tanaka | .................. | G06F 3/0483 |
| | | | | 715/775 |
| 2015/0074721 A1 | 3/2015 | Fishman et al. | | |

(Continued)

*Primary Examiner* — Pankaj Kumar
*Assistant Examiner* — Sahar Aqil Riaz
(74) *Attorney, Agent, or Firm* — John L. Rogitz

(57) ABSTRACT

For each network or type of content in an Android TV application, a main icon may be presented on a display, and when the screen cursor is positioned over a main icon, 3-5 sub-icons are presented under the main icon. Moving the screen cursor to another main icon causes the first sub-icons to disappear and new sub-icons relating to the new main icon to appear under the new main icon. Each sub-icon represents content associated with the main icon either using trending information, automatic content recommendation (ACR), time of day, etc. The user may select a sub-icon to show the related content. Thus, for each Android TV application, the most important, trending, live, or personal content is made available through the sub-icons such that a limited number of live content subsets is presented to choose from for that network at that moment.

19 Claims, 7 Drawing Sheets

(56) References Cited

U.S. PATENT DOCUMENTS

| | | | |
|---|---|---|---|
| 2015/0077326 A1* | 3/2015 | Kramer | G06F 3/0325 |
| | | | 345/156 |
| 2015/0089371 A1 | 3/2015 | Zaslavsky et al. | |
| 2015/0227590 A1* | 8/2015 | Nissen | G06F 17/30014 |
| | | | 707/728 |
| 2016/0301966 A1* | 10/2016 | Hoder | H04N 21/2743 |
| 2016/0357399 A1* | 12/2016 | Shin | G06F 3/04815 |
| 2017/0006346 A1* | 1/2017 | Ono | H04N 21/4821 |
| 2017/0300122 A1* | 10/2017 | Kramer | G06F 3/017 |
| 2018/0152767 A1* | 5/2018 | Liu | H04N 21/21805 |

* cited by examiner

DISPLAY EXPANSION FROM FEATURED APPLICATIONS SECTION OF ANDROID TV OR OTHER MOSAIC TILED MENU

FIELD

The present application relates to technically inventive, non-routine solutions that are necessarily rooted in computer technology and that produce concrete technical improvements.

BACKGROUND

Audio video display devices such as, to use an example for illustration, smart TVs, have multiple sources of content that is available for viewing through several different interfaces and applications. Content can be viewed from physical devices connected to the TV, such as a Blu-ray player, content applications residing on the TV, and from networked connections to the Internet and a Pay-TV Service Providers' video network.

As understood herein, a problem exists in viewers quickly and accessing relevant content as fast as possible in a live TV environment, owing to the large number of viewing choices available. Research indicates that many consumers aren't particularly pleased with many of the current options available to them when they're hunting for something to watch, especially when it comes to linear TV (which refers to first-run first broadcast TV programming). According to one report, almost half of U.S. consumers reported they can't find anything to watch on linear TV on a daily basis, and this difficulty has increased over the years. To compound the frustration, viewers spend almost 50% more time choosing what to watch content using video on demand (VOD) than linear programming.

Normally when a consumer searches for content the tiles shown on a guide represent a single content source. Sometimes the tile represents the file folder that expands into another folder of tiles that has the content selections. This kind of stacked or bracketed form of content discovery is rather lengthy if the number of tiles tends toward indefinite. While some providers such as Rovi, Tivo, and Gracenote have search engines and grid guides based on content databases they created with their own metadata, these features do not appear to assist consumers in quickly locating relevant content as much as would be hoped.

SUMMARY

In contrast to existing solutions, present principles use an Android TV application icon of a popular channel such as CBS News, opening up sub-icons underneath that are directly related to that icon programming. The additional selections can either be other channels or live content that is popular right at that moment. The live content then can be accessed instantly rather than going to another landing page. The uniform resource locators (URL), when selected for a particular icon, call up the content and metadata directly to the source rather than going to a Play store to launch the application from the play store. Essentially, a microsearch feature for a specific type of content is provided by the sub-icons. Sources for related content can be live or is filtered by personalized user data or automatic content recommendation (ACR) data for that particular viewer.

Accordingly, a device includes at least one computer memory that is not a transitory signal and that includes instructions executable by at least one processor to present at least first and second main icons on a display. The first and second main icons represent respective first and second video networks. The instructions are executable to, responsive to identifying a screen cursor indicating the first main icon, present with the first main icon at least three and no more than five first sub-icons and present no sub-icons with the second main icon. Each first sub-icon represents respective content related to content from the first video network. Still further, the instructions are executable to, responsive to identifying the screen cursor indicating the second main icon, present with the second main icon at least three and no more than five second sub-icons while presenting no sub-icons with the first main icon. Each second sub-icon represents respective content related to content from the second video network. The instructions are further executable to, responsive to identifying a selected first or second sub-icon, present the respective content associated with the selected first or second sub-icon.

In example embodiments, the content from the first video network is currently broadcast content. Content associated with a first or second sub-icon may be identified using social network trending information, or automatic content recommendation (ACR) information, or electronic program guide (EPG) information, or a combination of two or more of these information types.

In some implementations, the instructions can be executable to present at least a third main icon on a display. The third main icon can represent a respective video category. For example, the third main icon may represent a respective content type provided by an Android TV application.

In example implementations, wherein the instructions can be executable to, responsive to identifying a selected first or second sub-icon, present the respective content associated with the selected first or second sub-icon by accessing the respective content directly using a network address rather than going to a separate landing network address.

In another aspect, a method includes presenting at least two main icons on a display representing respective TV networks. The method also includes, responsive to a cursor being positioned over a first main icon, presenting three to five first sub-icons near the main icon, with each first sub-icon representing content associated with the respective first main icon over which the cursor is positioned. The method further includes, responsive to the cursor being moved a second main icon, causing the first sub-icons to disappear and presenting new sub-icons relating to the second main icon to appear near the second main icon. Each sub-icon represents content associated with its respective main icon as identified by automatic content recommendation (ACR) information, and responsive to identifying no ACR information, by popularity information, and responsive to identifying no ACR information and no popularity information, by curated information from a source of video. Also, the method includes, responsive to a selection of a sub-icon, presenting the content associated with the selected sub-icon.

In another aspect, an apparatus includes one or more displays, one or more processors, and one or more computer memories with instructions executable by the processor to present plural main icons on a display. The instructions are also executable to present at least first, second, and third top level icons on a display. The instructions are also executable to, responsive to cursor hover over the first top level icon, present at least first, second, and third second level icons on the display, with each second level icon including video content related to content represented by the first top level icon. The instructions are also executable to, responsive to cursor hover over the first second level icon, present at least first, second, and third third level icons on the display, remove the first top level icon, and present the second and third top level icons with the first second level icon and first, second, and third third level icons.

The details of the present disclosure, both as to its structure and operation, can be best understood in reference to the accompanying drawings, in which like reference numerals refer to like parts, and in which:

DETAILED DESCRIPTION

Figure 1:
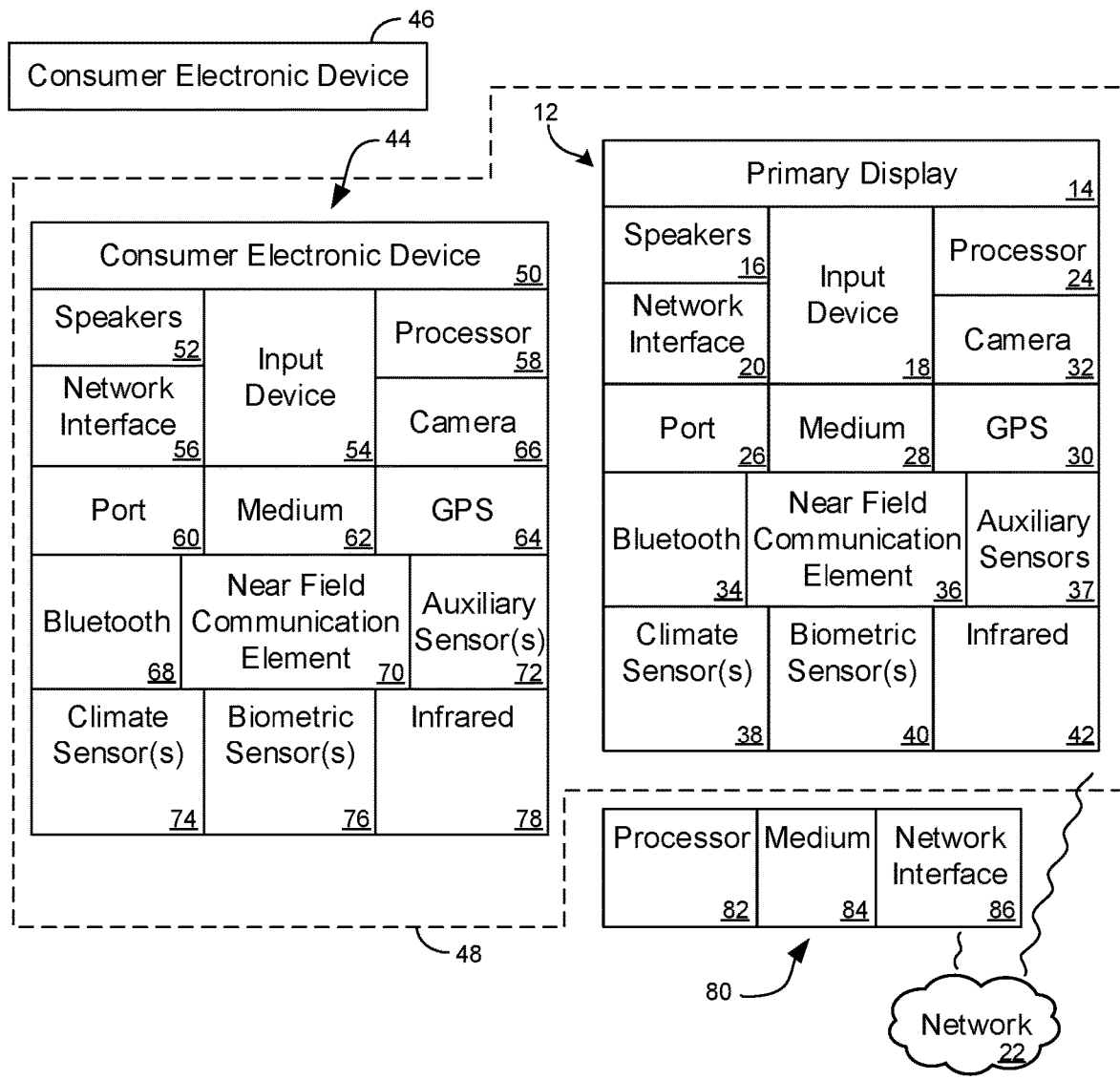
FIG. 1 is a block diagram of an example system including an example in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone.

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
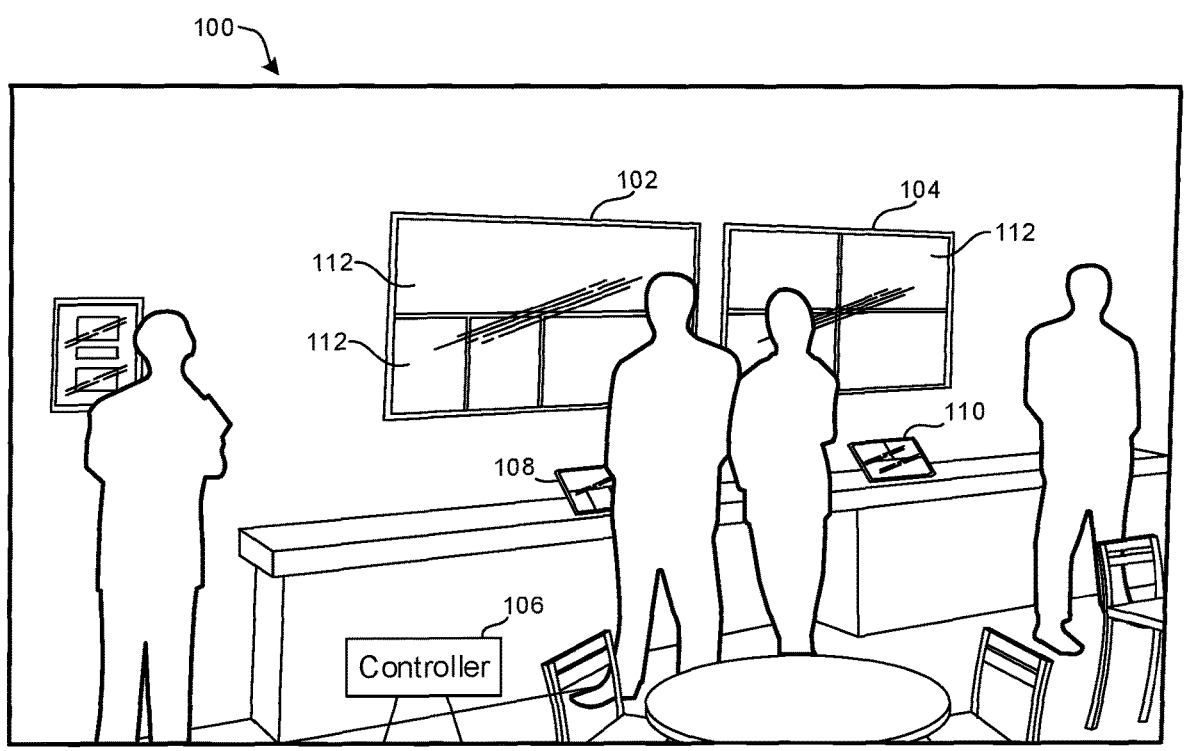
FIG. 2 is a partially schematic view of a specific example system with two UHD displays mounted on a wall side by side.

FIG. 2 shows an example system 100 in which one or more ultra high definition (UHD) displays 102, 104 are mounted on a wall, e.g., a wall of a home or a luxury stadium box. The UHD displays 102, 104 may be 4K displays or even higher resolution. One or more control devices control presentation of the displays by sending commands wirelessly and/or over wired paths to one or more controllers. In the non-limiting example shown, a controller 106 controls the displays 102, 104, it being understood that a separate controller may be provided for each display. In the non-limiting example shown, content control on the first display 102 is established by a first control device 108 while content control on the second display 104 is established by a second control device 110, it being understood that a single control device may be used to establish control on both displays.

The control devices 108, 110 may be, without limitation, portable computers such as tablet computers or laptop computers (also including notebook computers) or other devices with one or more of the CE device 44 components shown in FIG. 1. The displays 102, 104 may be monitors only and/or may include one or more of the primary display 14 components shown in FIG. 1. The controller 106 may be a personal computer (PC) or game console or server that contains one or more of the components variously shown in FIG. 1. In the non-limiting example shown, the control devices 108, 110 communicate directly with the controller 106 using, e.g., WiFi or Bluetooth; the control devices 108, 110 do not communicate directly with the displays 102, 104. Instead, the controller 106 communicates with the displays 102, 104 to establish presentation thereon in accordance with commands received from the control devices. It is to be understood that while the controller 106 is shown physically separate from the displays in FIG. 2, it may be incorporated within the chassis of a display. As also shown, the displays may present plural contents in respective content windows 112.

The following description inherits the principles and components of the preceding discussion. Present principles focus on each tile (also referred to herein as "icon") that represents a TV network or other source of content, such as those found on Android TV. The user of the TV has the option when the highlight is on a particular tile of interest such as CBS to have the top three or five live content programs appear right underneath that tile as a selection of subtitles. Those subtitles disappear if the user continues to cursor over to the next main tile in the UI or menuing system. However, when the user enters a select command such as, for example, pressing a down arrow key on a remote control (RC), the additional related content tiles are then activated for selection and the user can scroll through them forward and backward, or through a scrolling marque. What is shown typically may be three to five live tiles of the most important live content from that network or Android TV application. It can also be content that has been determined by ACR or other preference engine to be of top interest to the user at that time. Other filters for these live tile subsets from a main Android TV application can be based on time of day or based on day of week that relate to live programming. The point is that for each Android TV application, the most important, trending, live, or personal content is shown. And that the tiles do not sprawl forever left or right. The preferred "window" is 3-5 subtitles and that window can then carousel additional "hidden" tiles if the overall selection is beyond 3-5 tiles. A limited number of live subsets are provided to choose from for that network at that moment.

Figure 3:
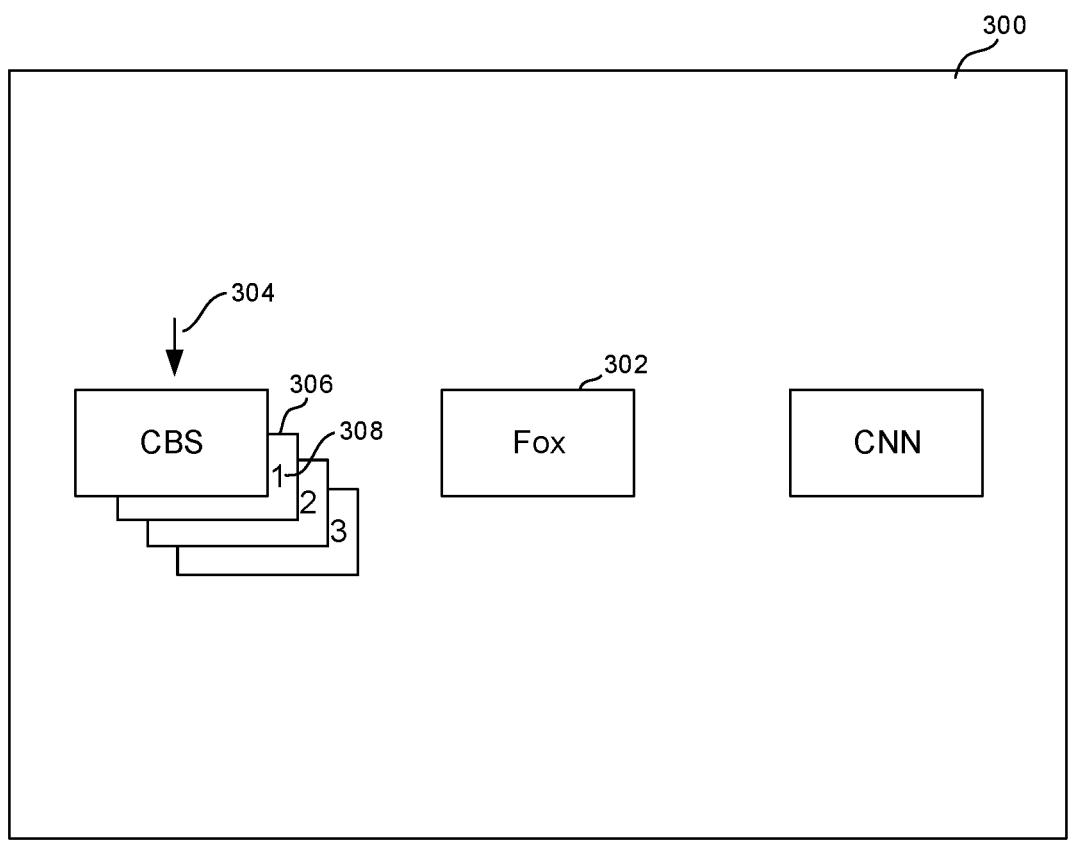
FIGS. 3-5 are example screen shots illustrating present principles.

Now referring to FIG. 3, any one or more of the processors described herein may present on a display 300 such as any one or more of the displays described herein plural main icons 302. As shown, three main icons 302 are presented, and each main icon represents a TV network, which is an example source of linear TV. Other main icons may represent respective video categories, for example, respective content sources provided by an Android TV application (e.g., Netflix®, Amazon Prime®, etc.)

It is to be understood that an electronic program guide (EPG) received by the display system or other data structure of available content sources may be accessed to ascertain what TV networks and Android TV applications are available, with the main icons 302 being selected accordingly either from a library of icons or by directly copying the respective logos from the EPG or by other means.

As shown, a screen cursor 304 may be positioned over one of the main icons 302, in the example shown, the icon 302 representing the TV broadcaster Columbia Broadcasting System (CBS). The processor controlling the display 300, responsive to identifying the screen cursor 304 hovering over the CBS main icon 302, presents with the CBS main icon at least three and no more than five sub-icons 306, presenting no sub-icons with the other main icons. Each sub-icon 306 represents respective content related to content from the network or content source represented by the associated main icon 302. Each sub-icon 306 may include an identifier 308 identifying the content represented by the sub-icon. While three to five sub-icons are preferred, in some examples greater or fewer sub-icons may be presented under or nearby an associated main icon. Of course, the main icon 302 may be selected to view currently broadcast video on the associated TV network or Android TV application, it being understood that the main icon 302 itself may present decimated currently broadcast video from the associated source.

Preferably, a sub-icon, like a main icon, contains a live video as a thumbnail, potentially with metadata superimposed on the video, e.g., the title of the broadcast show represented by the icon. The videos in the sub-icons may be sourced directly from the server of the broadcaster at low bit rates, such as below one MB per second in, e.g., a 600×400 pixel format at ¼ High Definition resolution. The content is thus accessed directly using, e.g., a network address of a Broadcaster server rather than going to a separate landing network address such as an Android TV application from which to access the content.

In the example shown, three sub-icons 306 are arranged in a stacked configuration under the main icon 302. Other arrangements may be provided. For example, the sub-icons 306 may be individually seen in the entirety instead of partially hidden in the stacked configuration shown and may be located around the main icon 302, such that one sub-icon can be located directly above the main icon, one 120° to the right of the top sub-icon, and the third 120° to the left of the top sub-icon. These are example arrangements without intended to exclude other presentation arrangements of sub-icons. When more than three sub-icons are presented, they can be similarly equidistantly spaced from each in the angular dimension around the associated main icon.

Figure 4:
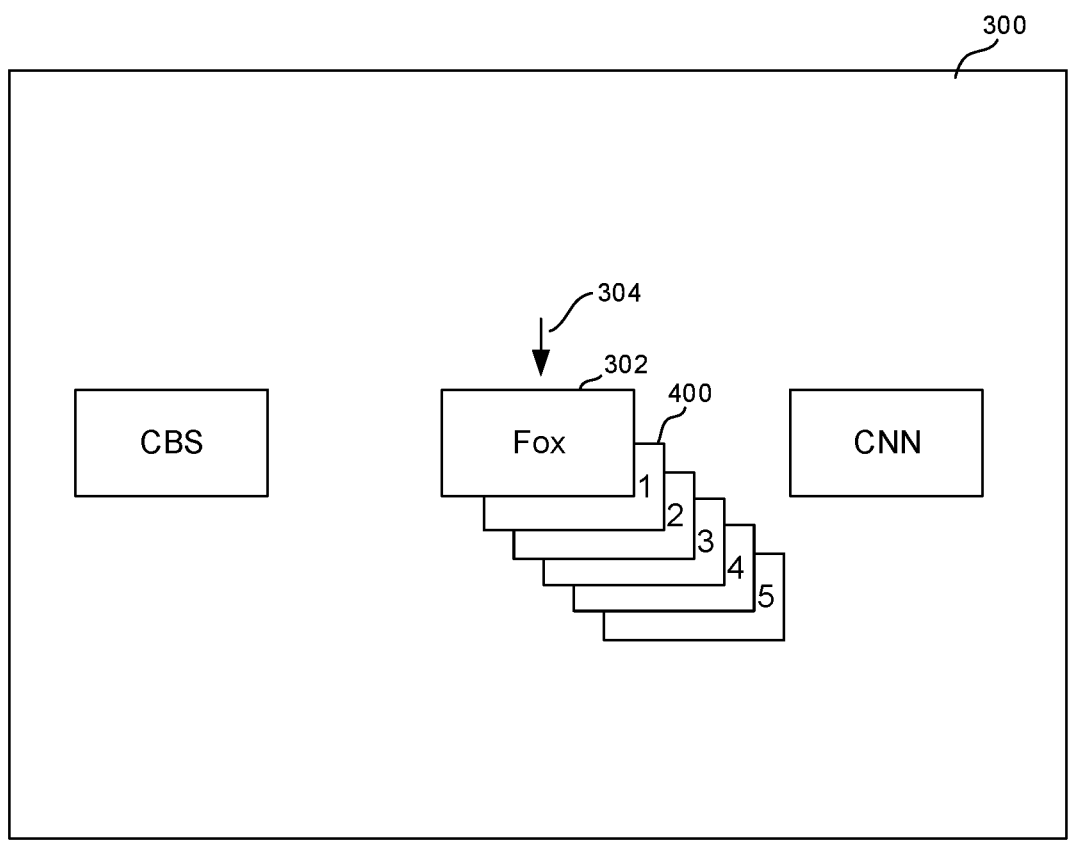

FIG. 4 illustrates that the screen cursor 304 has been moved over another main icon 302, in the example shown, the main icon representing the Fox network. Responsive to identifying the screen cursor 304 indicating the Fox main icon 302, five sub-icons 400 are presented by the Fox main icon 302, with the sub-icons 306 from FIG. 3 no longer appearing under the CBS main icon 302 as shown in FIG. 4. Each sub-icon 400 represents respective content related to content from the network or content source represented by the associated main icon 400.

Figure 5:
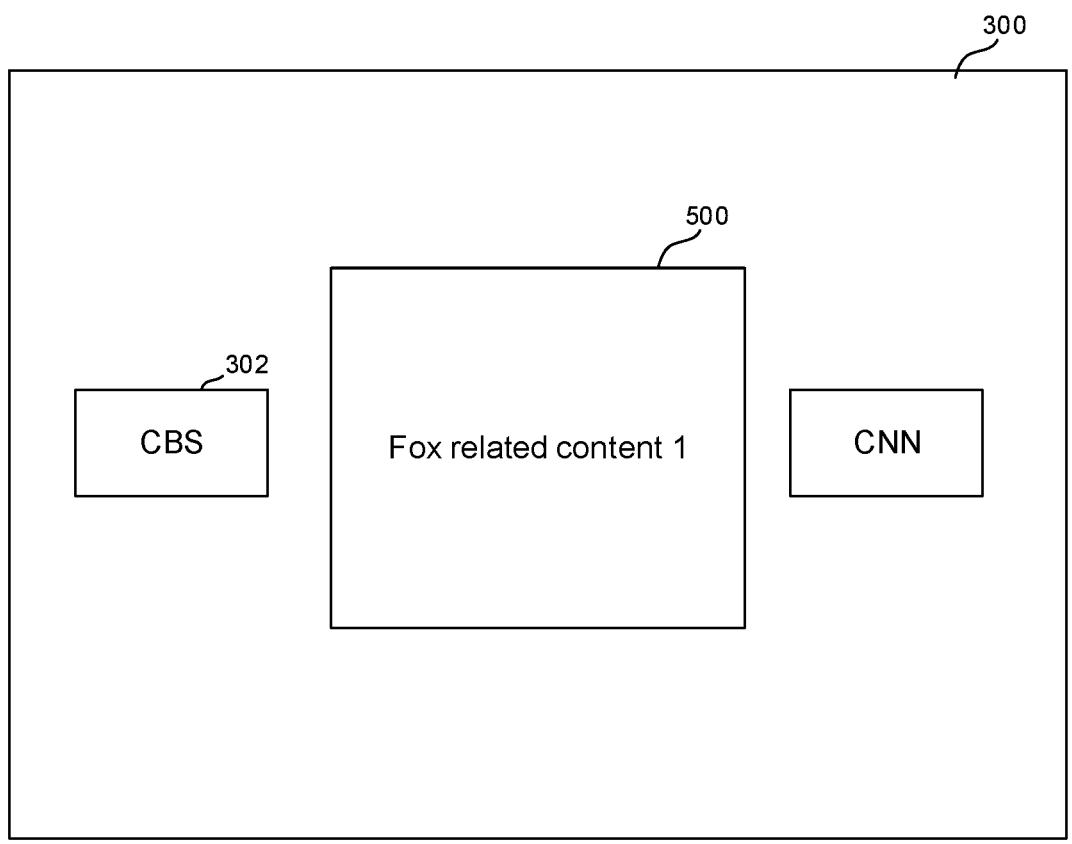

FIG. 5 illustrates what happens when a sub-icon 400 is selected. A viewer can input an activate command such as by speaking an activation word or manipulating a key on a remote control (RC) or performing a gesture in free space corresponding to an activation command. In an example, the viewer can press a key such as the down arrow on a RC to generate a signal to the display system that the sub-icons are to be activated. The viewer can use voice, gesture, or RC keys to scroll through the sub-icons to select a desired sub-icon by, e.g., manipulating an enter key on the RC. When a sub-icon is selected, a pane 500 as shown in FIG. 5 presents content represented by the selected sub-icon.

It is to be understood that when a sub-icon is elected, the respective content associated with the selected sub-icon is accessed directly using, e.g., a network address embedded in the selected sub-icon or otherwise associated with the selected sub-icon.

The content for the sub-icons shown and discussed herein may be identified using one or more source of content information. In some embodiments, the content is identified using automatic content recommendation (ACR) information. For example, using information (metadata, voice recognition, image recognition, as discussed above) from the broadcast content represented by the associated main icon, ACR based on the viewer's prior viewing habits, demographics, etc. may be used to identify three to five alternate contents related to the main icon content to establish the sub-icons for that main icon.

In a preferred embodiment, ACR information is preferred as the source for identifying the content in the sub-icons. If no ACR information is available, then content associated with a sub-icon may be identified using popularity indices such as social network trending information or Nielsen TV ratings. This may be accomplished by the processor automatically accessing metadata from the currently broadcast content associated with the main icon and using one or more terms from the metadata as entering argument to one or more social networking sites or Nielsen rating sources, returning one or more trending contents returned by the social network site as conforming to the terms used as entering argument. Instead of or in addition to metadata, the processor may execute voice and/or face recognition on frames of the content of the associated main icon to identify people or places being shown or discussed.

If no ACR or popularity information is available, the videos appearing in the sub-icons may be curated by the broadcaster. Yet again, content associated with a sub-icon may be identified using electronic program guide (EPG) information, such a time of day information, with content represented by sub-icons being selected to be, e.g., the three previously broadcast programs on the network represented by the main icon. These three programs may be recorded using, e.g., a digital video recorder (DVR) associated with the display 300. Typically the three to five related contents are the three to five "top" related contents identified by trending information or ACR or other measure.

In any case, in a preferred implementation the logic for selecting content for the icons is:

1. use ACR identified content;
2. if no ACR is available, use popularity measures to select the video content for the sub-icons;
3. if no ACR or popularity information is available, use videos curated by the broadcaster for the sub-icons.

Figure 6:
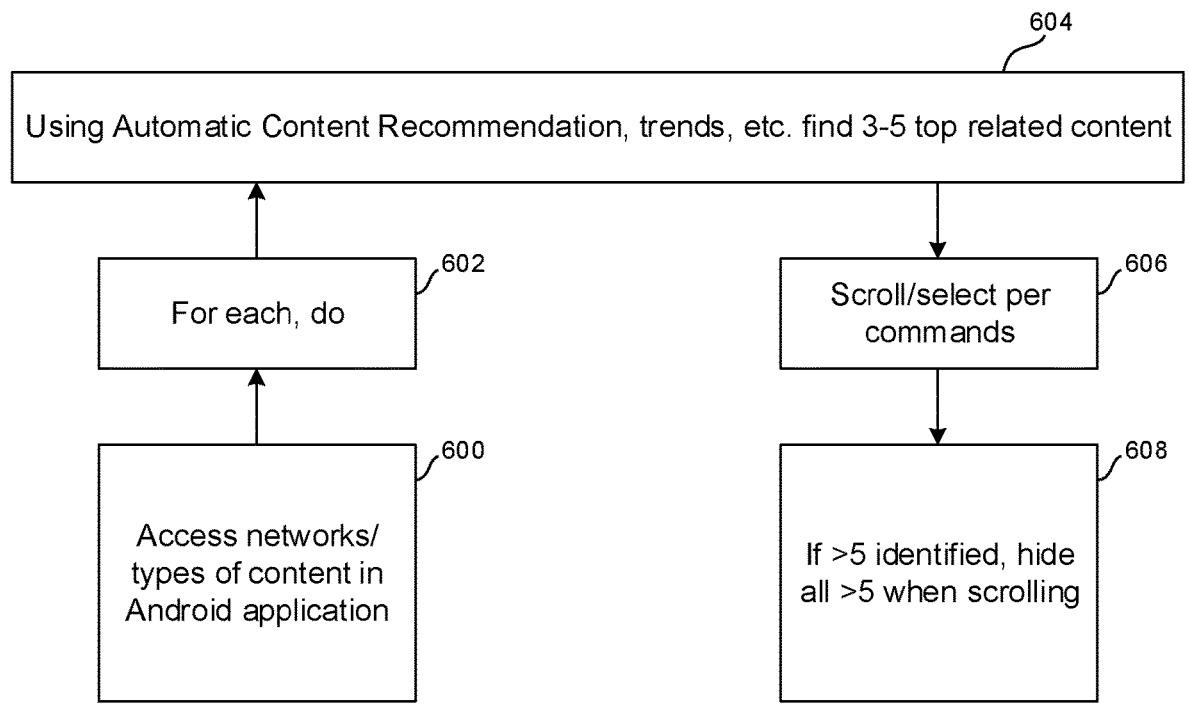
FIG. 6 is a flow chart of example logic related to FIGS. 3-5.

FIG. 6 further illustrates the above-discussed explanation. Commencing at block 600, the available networks and/or Android TV applications are identified and main icons produced for at least some of the identified networks. Block 602 indicates that for each TV network or Android TV application associated with a main icon, three to five related contents are identified at block 604 according to preceding principles, with appropriate sub-icons being presented for each identified content. The viewer may scroll and select sub-icons at block 606.

In the event that more than a threshold number of "top" contents are identified for a main icon, for example if more than five "top" contents are identified, at block 608 all but the threshold number of sub-icons are presented on the display. Scrolling to the end of the displayed sub-icons may result in additional sub-icons representing additional identified content replacing the scrolled-through sub-icons, so that no more than the threshold number of sub-icons appear under a main icon at any one time.

Figure 7:
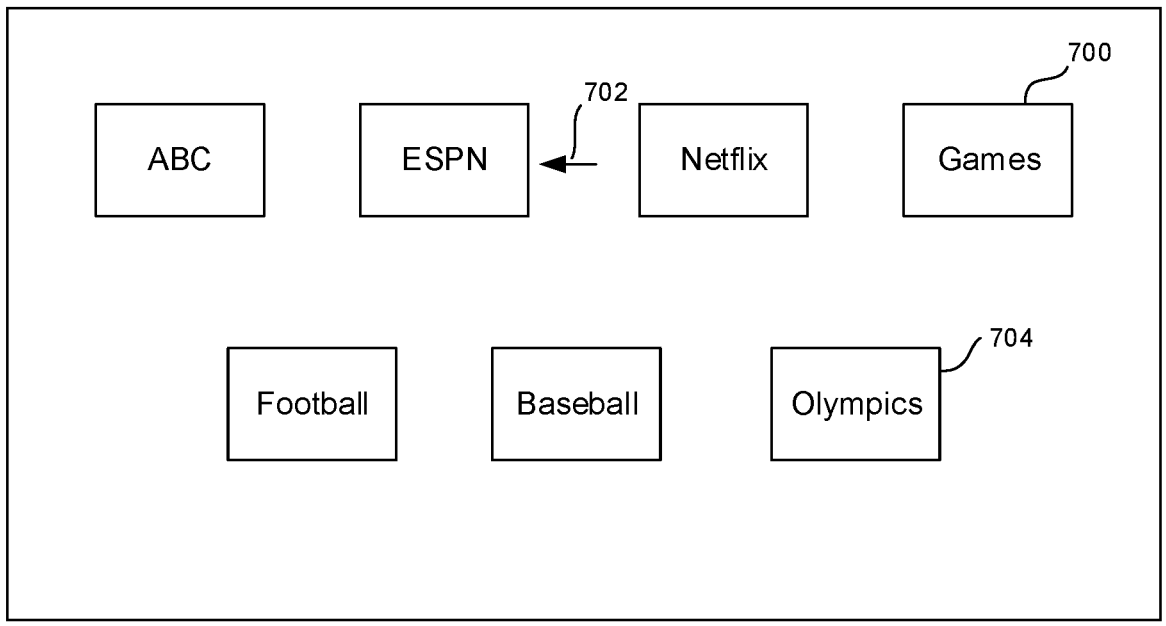
FIGS. 7 and 8 illustrate the multi-level features of present principles.

FIG. 7 illustrates further. Top level icons 700 are presented, in the example shown, in a row near the top of the display. The top level icons may represent TV broadcasters, Android applications such as movie applications, games, etc. or a combination thereof. As shown, the top level icons 700 include two TV broadcasters, ABC and ESPN, a movie application "Netflix", and a computer game application.

When a screen cursor 702 is used to hover over a top level icon 700, in the example shown, ESPN, three to five second levels icons 704 appear below that top level icon appear in the display in accordance with description above. In the example shown, the second level icons show a football video, a baseball video, and an Olympics video.

A user can click on a second level icon 704 as described above to cause the associated content to appear full screen. Or, as shown in FIG. 8, a user can hover the cursor 702 over one of the second level icons 704, in this case, the "baseball" icon, to cause the following.

Figure 8:
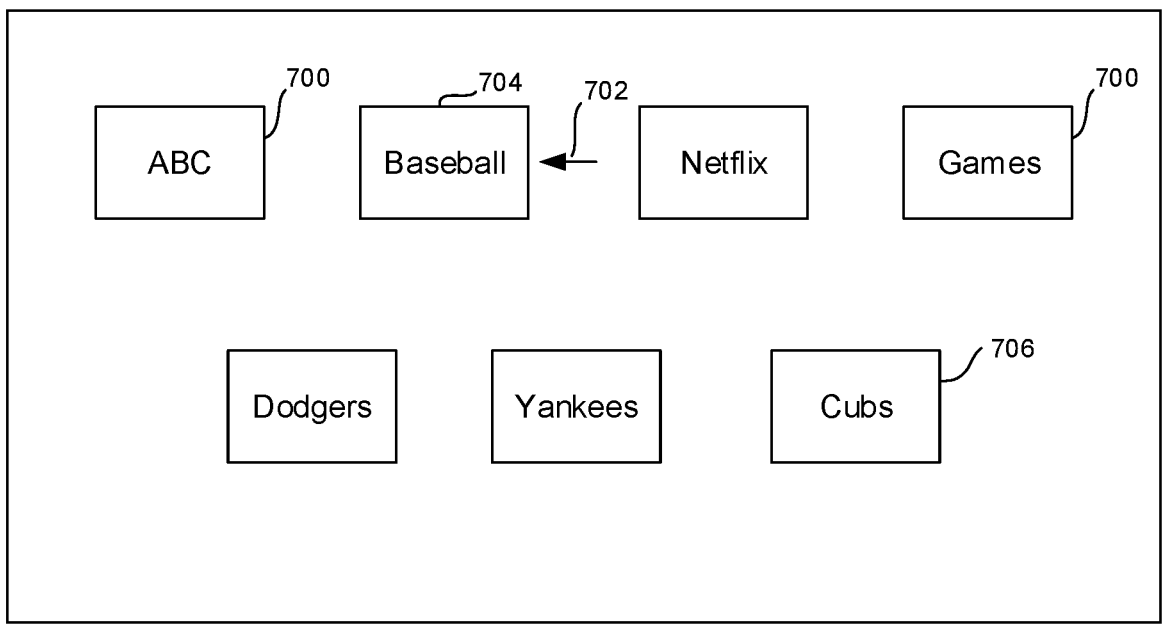

As shown in FIG. 8, the top level icon over which the cursor formerly hovered in FIG. 7 has been replaced by the second level icon 704 over which the cursor subsequently hovered, with the originally-shown top level icons 700 over which the cursor did not hover still appearing. In effect, the "hovered" second level icon 704 has replaced its parent top level icon but the other top level icons remain so that the viewer does not have to remember or otherwise scroll back through multiple menus to find the top level subject matter. Below the "hovered" second level icon appear plural third level icons 706, each presenting a video of a respective individual game related to the "hovered" second level icon, in this case, three individual baseball games that are currently being broadcast.

The above principles may extend to fourth and lower levels according to the principles divulged herein. For example, hovering over the "Cubs" third level icon 706 can result in the "cubs" icon replacing the "baseball" icon in the top level and multiple fourth level icons appearing below the "cubs" icon, perhaps representing respective highlights of individual Cubs players. The non-hovered over top level icons 700 remain presented on the display.

To illustrate further using a movie example, should the "Netflix" top level icon 700 be hovered over, multiple second level icons, e.g., 3-5 second level icons, may be presented, each containing a video of a movie identified using ACR as possibly being appealing to the viewer. Suppose one of those second level icons represents "My Fair Lady". Hovering the cursor over "My Fair Lady" results in the corresponding icon to replace the "Netflix" icon in the top level, with the other top level icons remaining in view, and 3-5 third level icons appearing in a juxtaposed relationship with the "My Fair lady" icon. These third level icons may include videos of other movies starring Audrey Hepburn or Rex Harrison (the leads in My Fair Lady) and hovering over, e.g., a third level icon representing the Hepburn movie "Breakfast at Tiffany's" may cause "Breakfast at Tiffany's" icon to assume the corresponding place on the top level with the unselected original top level icons and plural fourth level icons to be presented under "Breakfast at Tiffany's" icon, perhaps related to other respective actors or other Hepburn films, etc.

As described above, as the user places the lighted focus on a main-menu content display icon for a given brand of content, such as a broadcast network, interactive live tiles appear below, potentially as a scrolling selection and normally in the range of three to five animated/video icons at a time, with no fewer and no greater number visible at any one time in example embodiments. When the user clicks on one of the selectable sub-icons, the content represented by the selected sub-icon may play full-screen or more preferably plays in the respective top tile, replacing the content previously played in the respective top title. In this way, the tiles continue to be recycled with new content appearing in the same set of tiles, and not requiring any more display real estate or space. This advantageously facilitates quick navigation as the tiles themselves are not moving around or requiring refocus. The other tiles around the area of focus remain the same. Accordingly, if the user decides there is nothing there to watch he or she can start to re-focus immediately with the higher category next to the one originally in focus.

As divulged previously, the icon in focus, once selected, moves to the top position and then sub-icons will relate to that newly focused content (replacing the previously higher level content). In alternative embodiments, if the cursor 'hovers' over an icon for a defined period of time, a selection determination automatically may be made and the re-arrangement discussed will occur without the user manually pressing a select key, for example. For those who are quick reads, the length of the time period for determining an "automatic select" has occurred can be reduced to sub-seconds to quickly, without clicks, arrive as the deeper content in a particular brand or network such as ABC or NBC.

While the particular DISPLAY EXPANSION FROM FEATURED APPLICATIONS SECTION OF ANDROID TV OR OTHER MOSAIC TILED MENU is herein shown and described in detail, it is to be understood that the subject matter which is encompassed by the present invention is limited only by the claims.

What is claimed is:

1. A device comprising:
at least one processor configured to execute instructions to:
present at least first and second main icons on a display, the first and second main icons representing respective first and second video networks;
responsive to identifying a screen cursor indicating the first main icon, present with the first main icon at least three and no more than five first sub-icons and present no sub-icons with the second main icon, each first sub-icon representing respective content related to content from the first video network;
responsive to identifying the screen cursor indicating the second main icon, present with the second main icon at least three and no more than five second sub-icons and present no sub-icons with the first main icon, each second sub-icon representing respective content related to content from the second video network;
responsive to identifying a selected first or second sub-icon, present the respective content associated with the selected first or second sub-icon; and identify content associated with a sub-icon using, in order of preference, automatic content recognition (ACR), and responsive to no ACR being available, use popularity measures, and responsive to no ACR or popularity information being available, use videos curated by a broadcaster.

2. The device of claim 1, wherein the content from the first video network is currently broadcast content.

3. The device of claim 1, wherein content associated with a first or second sub-icon is identified using social network trending information.

4. The device of claim 1, wherein content associated with a first or second sub-icon is identified using automatic content recommendation (ACR) information.

5. The device of claim 1, wherein content associated with a first or second sub-icon is identified using electronic program guide (EPG) information.

6. The device of claim 1, wherein the instructions are executable to:
present at least a third main icon on a display, the third main icon representing a respective video category.

7. The device of claim 1, wherein at least one of the main icons represents a respective content source provided by an Android TV application.

8. The device of claim 1, wherein the instructions are executable to:
responsive to identifying a selected sub-icon, present plural third level icons below the selected sub-icon, each third level icon representing content associated with content represented by the selected sub-icon.

9. A method comprising:
presenting at least two main icons on a display representing respective TV networks;
responsive to a cursor being positioned over a first main icon, presenting three to five first sub-icons near the main icon, each first sub-icon representing content associated with the respective first main icon over which the cursor is positioned;
responsive to the cursor being moved a second main icon, causing the first sub-icons to disappear and presenting new sub-icons relating to the second main icon to appear near the second main icon, each sub-icon representing content associated with its respective main icon as identified by automatic content recommendation (ACR) information, and responsive to identifying no ACR information, by popularity information, and responsive to identifying no ACR information and no popularity information, by curated information from a source of video;
responsive to a selection of a sub-icon, presenting the content associated with the selected sub-icon; and
identifying content associated with a sub-icon using, in order of preference, automatic content recognition (ACR), and responsive to no ACR being available, use popularity measures, and responsive to no ACR or popularity information being available, use videos curated by a broadcaster.

10. The method of claim 9, wherein the popularity information comprises social network trending information.

11. The method of claim 9, wherein the popularity information comprises TV network ratings information.

12. An apparatus comprising:
at least one display;
at least one processor; and
at least one computer memory including instructions executable by the at least one processor to:
present at least first, second, and third top level icons on a display;
responsive to cursor hover over the first top level icon, present at least first, second, and third second level icons on the display, each second level icon including video content related to content represented by the first top level icon;
responsive to cursor hover over the first second level icon, present at least first, second, and third third level icons on the display, remove the first top level icon, and present the second and third top level icons with the first second level icon and first, second, and third third level icons;
identify content associated with at least one of the icons using, in order of preference, automatic content recognition (ACR), and responsive to no ACR being available, use popularity measures, and responsive to no ACR or popularity information being available, use videos curated by a broadcaster.

13. The apparatus of claim 12, comprising presenting at least three and no more than five second level icons under the first main icon to which the cursor moved.

14. The apparatus of claim 12, wherein at least one of the main icons represents a respective content source provided by an Android TV application.

15. The apparatus of claim 12, wherein the instructions are executable to:
responsive to identifying a selected first second level icon, present the respective content associated with the selected first second level icon by accessing the respective content directly using a network address rather than going to a separate landing network address.

16. The device of claim 1, wherein the instructions are executable to:
responsive to selection of a first one of the sub-icons, present content represented by the selected sub-icon, the content represented by the sub-icons being identified using information from broadcast content represented by the associated main icon to identify three to five alternate contents related to the main icon content to establish the respective sub-icons for that main icon.

17. The device of claim 1, wherein the instructions are executable to automatically access metadata from currently broadcast content associated with the first main icon and using one or more terms from the metadata as entering argument to one or more social networking sites or rating sources, return one or more trending contents returned by the social networking site or rating source as conforming to terms used as entering argument.

18. The device of claim 1, wherein the instructions are executable to receive videos appearing in the sub-icons as curated by a broadcaster.

19. The device of claim 1, wherein the instructions are executable to identify content associated with a sub-icon using electronic program guide (EPG) information, with content represented by sub-icons being selected to previously broadcast programs on the video network represented by the main icon.

* * * * *